(12) United States Patent
Rabenold et al.

(10) Patent No.: US 8,605,781 B2
(45) Date of Patent: Dec. 10, 2013

(54) REAL-TIME AND BANDWIDTH EFFICIENT CAPTURE AND DELIVERY OF LIVE VIDEO TO MULTIPLE DESTINATIONS

(75) Inventors: Nancy J. Rabenold, Brandon, FL (US); James A. Simmons, Brandon, FL (US); Daniel A. D. Paulovich, III, Brandon, FL (US)

(73) Assignee: Xcira, Inc, Tampa, FL (US)

( * ) Notice: Subject to any disclaimer, the term of this patent is extended or adjusted under 35 U.S.C. 154(b) by 1004 days.

(21) Appl. No.: 12/636,332

(22) Filed: Dec. 11, 2009

(65) Prior Publication Data

US 2010/0172403 A1 Jul. 8, 2010

Related U.S. Application Data

(63) Continuation of application No. 10/873,812, filed on Jun. 22, 2004, now Pat. No. 7,649,937.

(51) Int. Cl.
*H04N 21/658* (2011.01)
*H04N 7/50* (2006.01)

(52) U.S. Cl.
CPC .............. *H04N 7/50* (2013.01); *H04N 21/658* (2013.01)
USPC .................................................. 375/240.01

(58) Field of Classification Search
None
See application file for complete search history.

(56) References Cited

U.S. PATENT DOCUMENTS

| | | | | |
|---|---|---|---|---|
| 5,870,495 | A  * | 2/1999 | Mancuso et al. | 382/199 |
| 6,091,777 | A  * | 7/2000 | Guetz et al. | 375/240.11 |
| 6,664,969 | B1 * | 12/2003 | Emerson et al. | 345/544 |
| 6,891,834 | B1 * | 5/2005 | Dally et al. | 370/395.4 |
| 7,116,353 | B2 * | 10/2006 | Hobson et al. | 348/150 |
| 7,158,479 | B1 * | 1/2007 | Noble | 370/229 |
| 7,299,291 | B1 * | 11/2007 | Shaw | 709/231 |

* cited by examiner

*Primary Examiner* — Nhon Diep
(74) *Attorney, Agent, or Firm* — Smith Risley Tempel Santos LLC; Gregory Scott Smith

(57) ABSTRACT

Disclosed is a method and system to deliver real-time video data over the Internet in a bandwidth efficient manner. A streaming processor receives raw video data from a video source and communicates a compressed version of the video data to a reflector network. The video data is compress by grouping pixels into blocks and comparing blocks of adjacent frames of video data to identify any changes. Only blocks that have been changed are transmitted to the reflector network. In addition, if a block has been changed in a manner to create a previously transmitted block, then only an identification index for the block is transmitted. The actual content of the block can then be recreated by comparing the index to a list of previously received blocks. The reflector network provides the compressed video stream to multiple clients through a series of reflectors. Each client can customize the quality of the video stream received by requesting a full-stream of a sub-stream from the reflector network.

6 Claims, 6 Drawing Sheets

|   | A | A | A | A | A |
|---|---|---|---|---|---|
| 510 | A | B | B | B | A |
|   | A | B | B | B | A |
|   | A | B | B | B | A |
|   | C | C | C | C | C |

Fig. 5

| A | A | A | A | A |
|---|---|---|---|---|
| A | B | B | B | A |
| A | B | B | B | A |
| A | B | B | B | A |
| C | C | C | C | C |

510

| A | A | A | A | A |
|---|---|---|---|---|
| A | A | B | B | B |
| A | A | B | B | B |
| A | A | B | B | B |
| C | C | C | C | C |

REAL-TIME AND BANDWIDTH EFFICIENT CAPTURE AND DELIVERY OF LIVE VIDEO TO MULTIPLE DESTINATIONS

CROSS-REFERENCE TO RELATED APPLICATIONS

This application is a non-provisional application being filed in the United States as a continuation of U.S. patent application Ser. No. 10/873,812 filed on Jun. 22, 2004 now U.S. Pat. No. 7,649,937.

BACKGROUND OF THE INVENTION

The present invention is directed towards the delivery of video content through a network and, more specifically providing real-time, bandwidth-efficient delivery of live video data to multiple destinations in a non-buffered manner.

The Internet, as we know it today, traces its roots back to 1969 where the first successful message was delivered over its ancestral network, the ARPANET. In 1974, a commercial version of the ARPANET was introduced to the market and by 1977 the ARPANET had grown to 111 hosts. In 1982, the Transmission Control Protocol (TCP) and the Internet Protocol (IP) were adopted as the standard data protocols (TCP/IP) for linking together various networks, such as the ARPANET. These linked networks are what we today call the Internet. Today, there are more than two million Internet hosts and over 840 million users around the world.

The Internet is quite versatile in the types of data and content that can be delivered, as well as in the types of equipment or destinations to which such data and content is delivered. The versatility of the Internet is due in part to the mechanism used for transmitting data. In essence, the Internet allows any type of data or content to be delivered as long as the data or content is packed in data packets in conformance with the TCP/IP protocol requirements. Thus, the Internet can be used for the delivery of content such as data, audio and video.

In the delivery of voice and/or video over the Internet, several technical issues must be confronted. The amount of data that is required to represent an audio or video signal can be quite extensive. When delivering large amounts of data over the Internet, there is an increased probability that data packets containing portions of the audio or video signal can be lost, damaged or delayed. As a result, there can be a significant lag time in the delivery of the content. In addition, the amount of data, especially for video content, that must be transmitted is quite enormous. Thus, significant delays can be incurred in the delivery of the content due to bandwidth constraints.

One method that has been introduced to address these problems is to reduce the quality of the delivered signals. Such a technique would allow the content to be delivered in a more bandwidth efficient manner, however, as the world is migrating towards higher quality (i.e., the introduction of digital radio, DVDs, High-Definition TV, etc.) it may be quite reluctant to adopt such an inferior technology.

Other solutions for providing audio or video over the Internet rely heavily upon the use of buffering. Buffering is a process whereby a receiving machine will request audio or video data and will store a certain amount of time worth of data into a buffer before starting to playback the content. While the stored content is being played back, the computer requests the downloading of additional data. The goal is to continually maintain a continuous feed of the audio or video by continually loading the buffer while the content is being played. The problem with this technique is that the playback of the content is not in real-time, it is delayed at least by the amount of time to fill up the buffer initially. In addition, during heavy traffic periods, the buffer may be emptied prior to completely downloading additional data. In this situation, the playback can be choppy or delayed and results in frozen frames.

Another method that has been introduced is the use of data compression. Current state of the art data compression techniques allow for a reduction in the amount of data required to deliver audio and/or video content. However, even using current state-of-the-art data compression techniques, the delivery of real-time video is still subject to significant delays.

Therefore, there is a need in the art for a method and system to deliver video data over the Internet in a bandwidth efficient and real-time manner that alleviates delays due to content delivery or buffering.

BRIEF SUMMARY OF THE INVENTION

The present invention provides a solution to the above-mentioned needs in the art by introducing an innovative way to capture live video into a stream, and distribute it for presentation to a large number of viewers in a bandwidth considerate and near real-time, un-buffered manner.

More specifically, aspects of the present invention allow for the real-time transmission of video from one source to many viewers using a TCP/IP capable network such as the Internet. The video is captured using a video camera or other video source including pre-stored memory, is processed and then transmitted to clients via a matrix of servers. Embodiments of the present invention can support multiple clients connected to the video source at a variety of connection speeds, connection types and bandwidths.

An exemplary embodiment of the present invention is presented as including a streaming process/system, a master reflector process/system, a workhorse process/system, a chained reflector process/system and a client process/system. The streaming process receives raw data from a video source and provides a compressed and encoded data stream to the master reflector process. The master reflector process utilizes the services of a workhorse process to further sub-divide the data stream into additional data streams having the same or a lower level of quality. The master reflector than delivers the data streams to requesting client processes through a matrix of chained reflector processes.

One aspect of the present invention includes an encoding technology that greatly reduces the amount of data necessary to transmit live video data. This aspect of the present invention leverages off the assumption that only small changes occur in an image from one frame to the next. This aspect of the present invention operates to compare a newly captured frame with the prior frame and only transmits the portions, or a representative equivalent of the portions of the image that have changed.

Another aspect of the present invention is the use of a reflector layer matrix for the delivery of the video content. This aspect of the present invention utilizes innovative methods for implementing variable bandwidth streams, scalability, and redundancy through the use of workhorse servers and reflector chaining.

BRIEF DESCRIPTION OF THE SEVERAL VIEWS OF THE DRAWING

FIG. 5 is a diagram of an exemplary frame illustrating the advantages of the dictionary encoding aspect of the present invention.

FIG. 6 illustrates another example in which the benefit of the dictionary look-up encoding aspect of the present invention is beneficial.

DETAILED DESCRIPTION OF THE INVENTION

The present invention provides a solution for the provision of real-time video over the Internet in a bandwidth efficient manner. More specifically, the aspects of the present invention operate to encode and compress video data in a manner to greatly reduce the amount of data that needs to be delivered for the provision of real-time video. The aspects of the present invention provide a single high-quality feed of the video data to a distribution network. The distribution network operates to further alter the characteristics of the video data streams to provide high-quality or lesser-quality video feeds to client devices as requested.

Advantageously, the present invention allows real-time delivery of video data over the Internet in a bandwidth efficient manner without the need for buffering on the client side.

For illustrative purposes only, the present invention is described as being embodied within a real-time, distributed live auction scenario. This scenario is an ideal embodiment for the present invention due to the time constraints imposed on the delivery of audio and video. In such a setting, auction items are moved through the lanes of an auction house at a rate of 7 to 10 seconds per item. Local bidders and remote bidders need to be at equal standing regarding their ability to view and analyze the item up for bid, and to enter bids for the item. Any significant delay in audio or video presentation to the remote bidders can operate to place the remote bidders at a disadvantage to the on-site bidding audience. Thus, the present invention advantageously provides a solution that is ideal for implementation within this environment. However, those skilled in the art will readily appreciate that aspects of the present invention can also be incorporated into a variety of settings and will realize the benefits of incorporating various aspects and features of the present invention into these settings. Thus, the present invention is in no way limited to the embodiments described within this specification.

Now turning to the drawings in which like numerals and references refer to like elements throughout the several views, various aspects and embodiments of the present invention are described.

Figure 1:
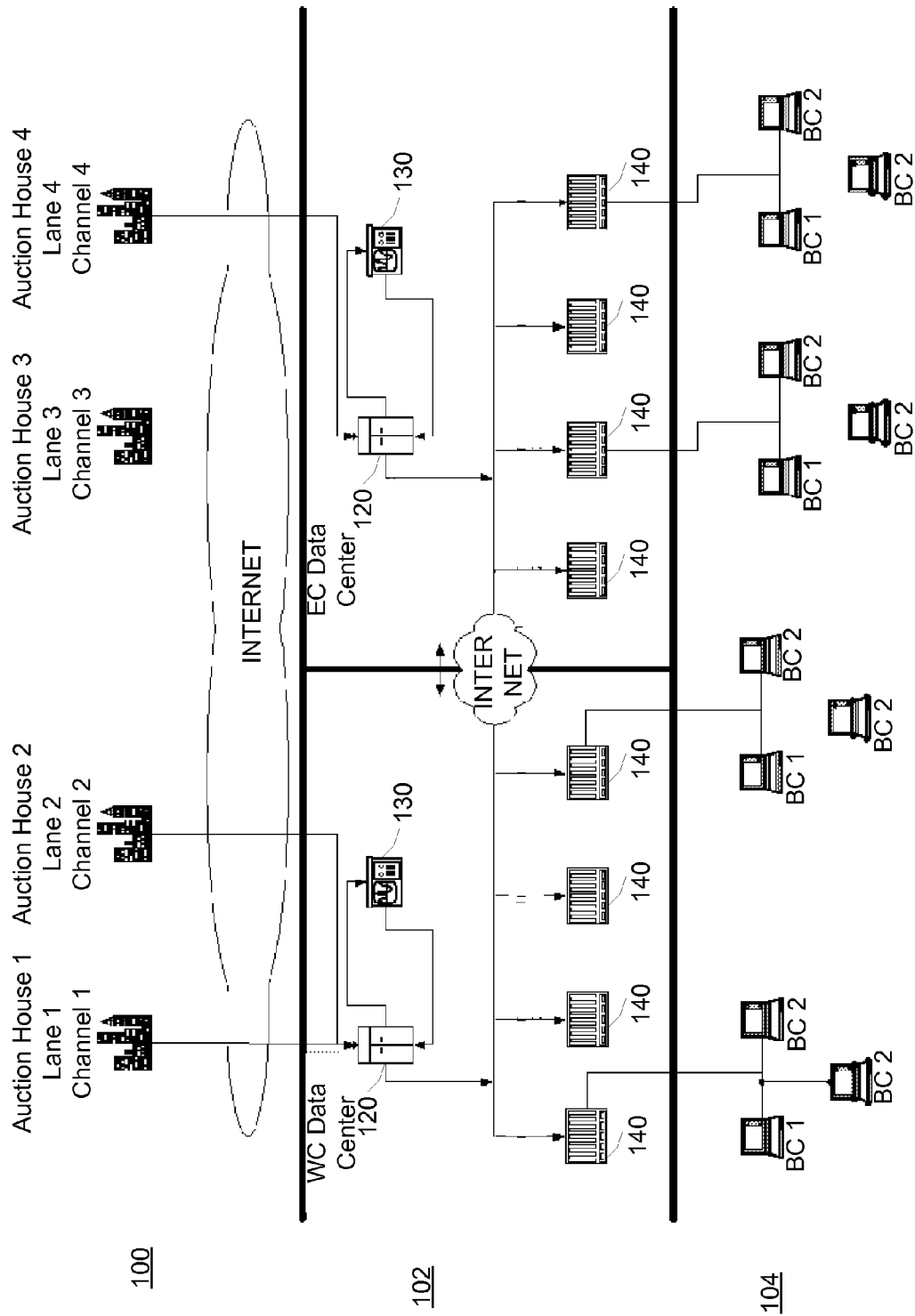
FIG. 1 is a system diagram illustrating an exemplary embodiment of the present invention.

FIG. 1 is a system diagram illustrating an exemplary environment for an embodiment of the present invention. Viewing aspects of the present invention from an overall architectural perspective, the illustrated embodiment is shown as including three functional layers: the streamer layer 100, the reflector layer 102 and the client layer 104. These three layers share information with each another to make the entire system work, and each layer performs a particular function in transmitting the video from the source to the end user (also called the client) through part of the system called a reflector matrix. Each of these three functional layers can be housed and run on a single computer or groups of computers connected to one another via local networks or the Internet and each preferably uses TCP/IP to transmit information.

The streamer layer 100 includes a process that operates to capture, process, encode and compress image files and then transmit the image files to the master reflector 102.

The main function of the reflector layer 102 is to distribute a video stream to the client layer 104. In an exemplary embodiment, the reflector layer a102 is comprised of three categories of server applications:

Master Reflector 120—The master reflector 120 operates to receive incoming streams and distributes them throughout the rest of the reflector layer 102 applications.

Workhorse 130—The workhorse 130 operates to receive variable frame rate streams and publishes a constant frame rate stream on a sub-stream channel.

Chained Reflector 140—The chained reflector operates to receive the streams and sub-streams from the master reflector and publishes them to the client layer 104.

The purpose of the client layer 104 is to connect to the stream, request video for a particular live event and then decode the video information for display on a computer monitor.

Streamer Process.

As an overview, the streamer process operates to capture, compress, encode and transmit the video data. Traditional video data, such as movies, are based on frames. These frames are still snapshots of a moment in time. The illusion of motion is obtained by presenting a series of frames in sequence to an observer. Modern digital video technology works in the same way. The difference is that the images are encoded digitally instead of on celluloid film.

Once a video camera "sees" an image, the image is compressed and encoded to reduce bandwidth and to add sequencing of frames. The streamer process manipulates the image data from the camera. As its input, the streamer process captures raw data that represents a snapshot taken at a particular instant in time. This snapshot is referred to as a frame. Several frames played in rapid succession make up the moving scene. The streamer application processes each frame algorithmically decreases the size of the frames being transmitted, decreases the processing and transmission times for each frame, and allows remote control of stream attributes such as jitter and frame rate.

Figure 2:
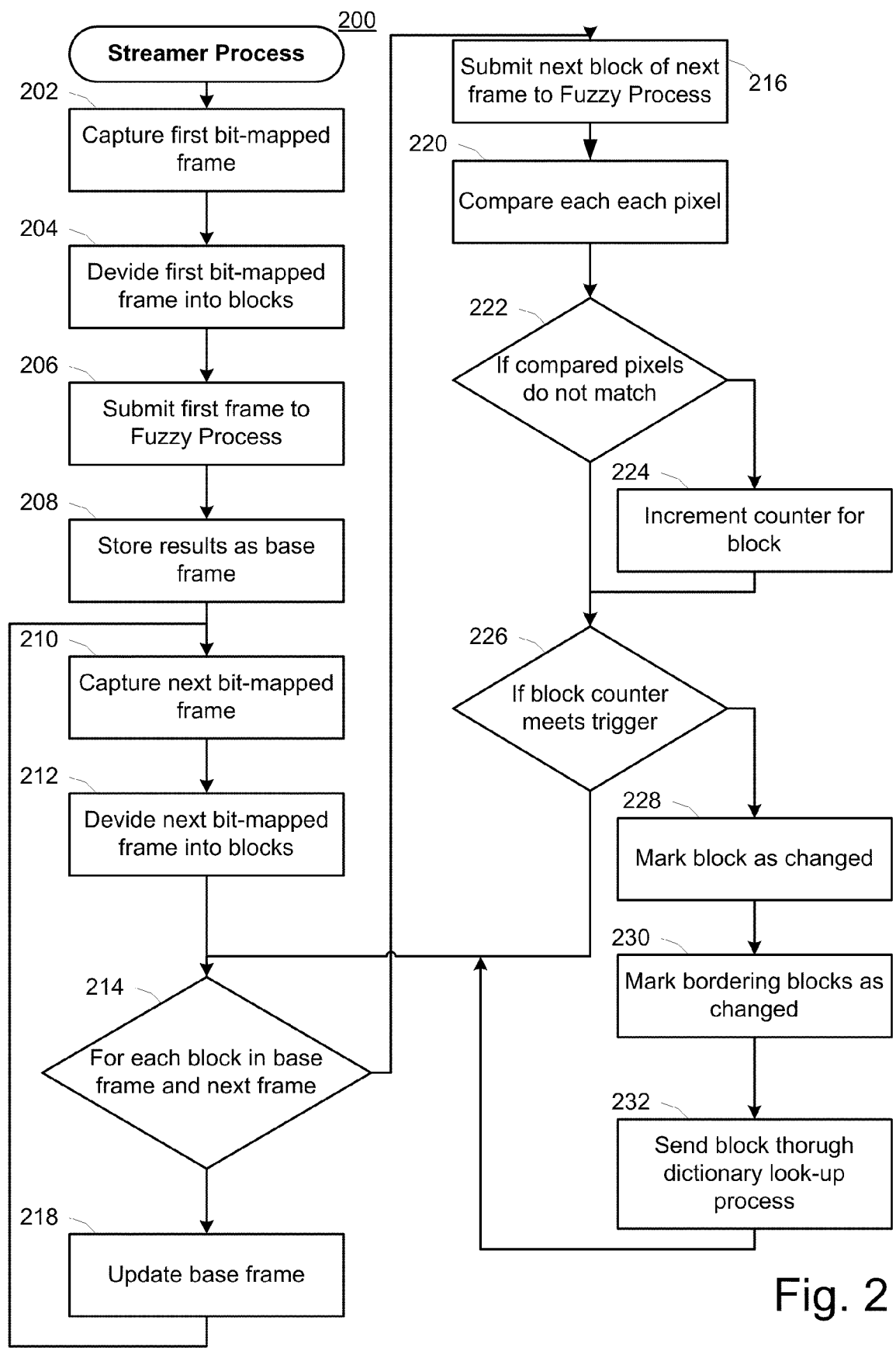
FIG. 2 is a flow diagram illustrating the steps involved in an exemplary embodiment of the streamer process.

FIG. 2 is a flow diagram illustrating the steps involved in an exemplary embodiment of the streamer process. The ordering of the steps and the particular functionality of each step is simply for illustrative purposes only and it is anticipated that other flow processes could be implemented to accomplish the same results. At step 202, the streamer process 200 captures a first frame from the video source. The first frame is in an uncompressed digital format (raw image data). In an exemplary embodiment, the raw image data can be acquired through a standard Linux device API. This raw image data is typically a frame constructed as a bitmap, which by definition is made from a matrix of pixels. For purposes of discussion, a pixel can be considered as the basic programmable video unit for a computer display. The specific color of a pixel is some combination of three primary colors—red, green and blue (RGB). It should also be appreciated that a pixel could be a boolean function (i.e., black or white, on or off) or a grey scale value; however, for purposes of illustration, the various aspects of the present invention are described in conjunction with colored pixels. Generally, a color pixel for an image can be specified using 24 bits with one byte or octet being used to store each color value. The bitmap defines the display space with respect to the upper left corner of the image and defines the color for each pixel. Other techniques can be used to represent pixels and the present invention anticipates the use of such other techniques. For instance, the pixel may include a characteristic component that identifies various attributes of the pixel including color components, shading, brightness, etc. The present invention can be easily adapted to work with any form for defining a pixel.

Figure 3:
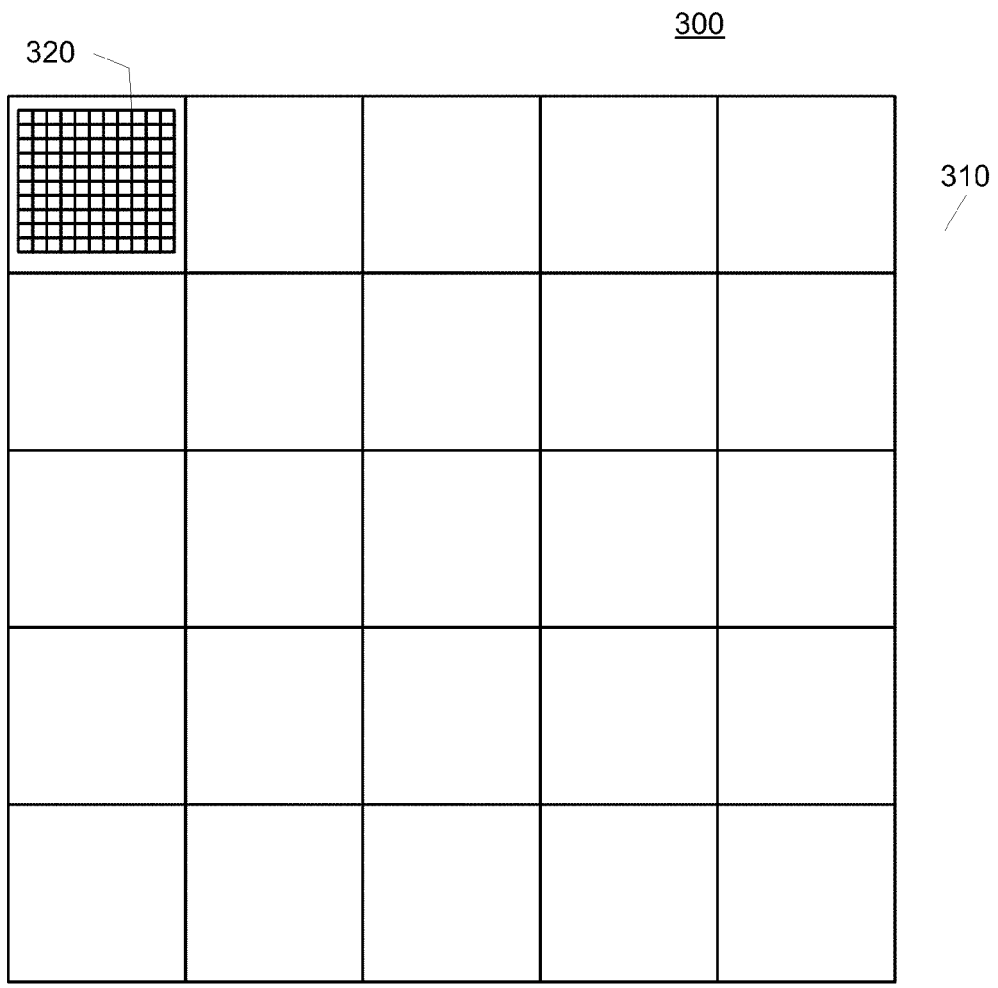
FIG. 3 is a block diagram illustrating one embodiment of the relationship of blocks to pixels.

The streamer application takes the array of pixels and divides the bitmap into blocks 204. A block is a collection of pixels, preferably representing a structured portion of the entire image, such as a geometric shape (i.e., square, rectangle, triangle or other shape). The dimension of a block is measured in pixels and is configurable. FIG. 3 is a block diagram illustrating one embodiment of the relationship of blocks to pixels. In the illustrated embodiment, a frame or a portion of a frame 300 is shown as consisting of 25 blocks 310 (5 blocks by 5 blocks). Each block 310 includes a pixel matrix comprised of 100 pixels 320 (10 pixels by 10 pixels) of information.

The first frame is then submitted to a fuzzy process 206. During the fuzzy process 206, the RGB values for each pixel are rounded to the lowest multiple of a configurable fuzzy value. For example, if the red value of a pixel is 201 and the configured fuzzy value is 10, then the fuzzy process returns the value of 200 for the red value of that pixel. Advantageously, the fuzzy process can result in reducing the number of possible values for each color component of a pixel from 255 down to 25 through this rounding process. The results of submitting the first frame to the fuzzy process are stored as the base frame 208. This base fram may also be transmitted in its entirety to client devices. It should be appreciated that the fuzzy process could also implement a rounding up capability or a rounding to the nearest fuzzy gradient and that the present invention is not limited to any particular configuration. In addition, a granularity rule can be established for any characteristic component of a pixel. The granularity rule can be used to group like characteristics in a granular manner. It should also be appreciated that the fuzzy process 206 may be eliminated in other embodiments of the present invention or selectively enabled for specific client devices.

At step 210, the streamer process captures a next frame from the video source.

At step 214, a looping process is initiated that compares the base frame to the next frame. This is performed on a block by block basis. Thus, for each block in the frame, the loop is performed.

Similar to the first frame, the next frame is converted into blocks 212 and then submitted to the fuzzy process 214 one block at a time. By submitting the pixels of each frame to the fuzzy process, a higher probability of a match between pixel elements on adjacent frames is obtained because the range of a match can cover the fuzzy value. In the example provided where the fuzzy value is 10, a match will be found for color ranges that span 10 points (i.e., 142 will match with 149).

Figure 4:
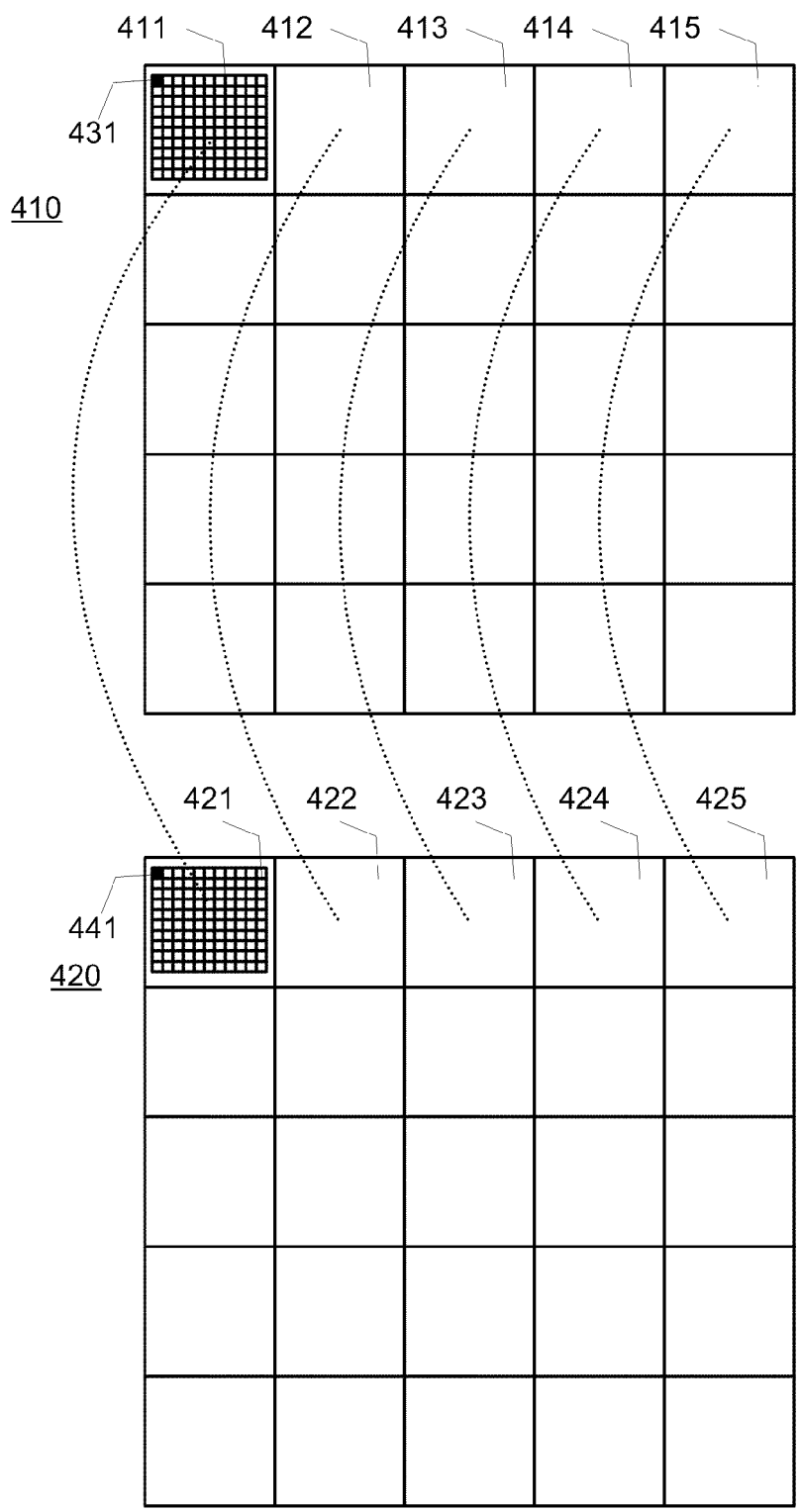
FIG. 4 is a diagram illustrating the relationship of the blocks of a frame when comparing adjacent frames.

The comparison loop operates to compare each pixel in the current block of the base frame with the corresponding pixel in the current block of the next frame. FIG. 4 is a diagram illustrating the relationship of the blocks of a frame when comparing adjacent frames. Each block in the base frame 410 has a corresponding block in the next frame 420. As illustrated, blocks, 401-415 in the base frame 410 correspond to blocks 421-425 in the next frame respectively.

The streamer then compares each pixel from the newly captured frame to the corresponding pixel in the previous frame 222. In the illustrated example, pixel 431 corresponds to pixel 441 etc. If the two pixels do not match, a counter for the block that the pixel belongs to is incremented 224 and processing continues at step 226. In one embodiment, two pixels are defined as not matching if any two of the three color values do not match. Those skilled in the art will appreciate that other criteria or different criteria could also be applied. For instance, two pixels can be defined as not matching is any one of the three color values to not match, if all three of the color values to not match, if one of the color values do not match by a first threshold difference and another of the color values do not match by a second threshold level. Those skilled in the art will appreciate that a large variety of such criteria could be used and that the present invention is not limited to any particular definition.

If the pixels match, or after the block counter is incremented, the block counter is compared to a configurable trigger value (configured value is typically a percentage of pixels in a block) 226. If the block counter meets or exceeds the trigger value, the block is marked as a changed block which ultimately needs to be transmitted 228. In addition, in some embodiments, each of the blocks that border the block with a counter meeting or exceeding the threshold can also be marked as changed blocks that need to be transmitted 230. In other embodiments, the blocks adjacent to the marked block can be reexamined with a different trigger value to determine if the reexamined block should be marked as changed and necessary for transmission. Advantageously, this aspect of the present invention allows the trigger parameter to be set higher because glancing moves within a block that normally would not trigger a change can be detected and sent.

Stated another way, one of the concepts addressed by this aspect of the present invention is that scattered pixel differences are not as noticeable as when the pixels are side by side. For instance, if you have 50 adjacent pixels different in a block, this is more noticeable than having 50 non-adjacent pixels. This aspect of the present invention detects adjacent differences and weighs them higher when determining the need for transmitting blocks.

The block is then sent through a dictionary look-up encoding routine 232. Upon completion of the comparison of pixels, the new frame values are copied over the corresponding values in the base frame buffer 218 and processing returns to step 210 in preparation for the next frame.

The dictionary encoding routine allows for a compression in the data transmitted. The streamer process 200 keeps a list of the last (n) blocks which have been transmitted. The value (n) is a configurable parameter and can be tuned for specific stream content. Each block in this list has a unique identification. When blocks are identified as having changed from the prior frame, the new block is compared to each block in this list. If a match is found the application sends only the index value or identification of the matching block as part of the stream instead of the bitmap data. Advantageously, this aspect of the present invention results in reducing the amount of data transmitted. For instance, if the identification is a two-byte value, the reduction of transmitted data for a 300 byte block would be reduced to only 2 bytes. If a match is not found, the streamer process 200 adds the block to the list and truncates the oldest entries, if necessary, based on the configurable limit.

This approach is advantageous in at least two situations. The first situation is when blocks are duplicated within a frame. This could be due to various reasons, one such reason being that the blocks may represent a consistent background or a portion of a larger, uniformly-colored object. If the frame includes a constant colored background, the data for each block that contains only the background is only transmitted once. Subsequent occurrences of the same block within the same frame would only require the transmission of 2 bytes of data.

In one embodiment, the dictionary is initially loaded with earliest transmitted blocks. This would include the blocks in the base frame and subsequently modified blocks until the dictionary is full. However, the dictionary could also include canned or commonly transmitted blocks. For instance, the dictionary could include entries for solid colored blocks, or blocks with copy shapes or configurations. In addition, the dictionary can be forced to retain blocks based on the frequency that the blocks appear in the streaming video.

FIG. 5 is a diagram of an exemplary frame illustrating the advantages of the dictionary encoding aspect of the present invention. Each block within the frame includes a letter. Blocks with common letters represent blocks that contain identical or similar video information. The encoding of this frame through the dictionary encoding process would result in the following raw encoding sizes:

|  | # Sent | Size in Bytes | Total Size |
|---|---|---|---|
| 300 bytes for one instance of block A full data | 1 | 300 | 300 |
| 300 bytes for one instance of block B full data | 1 | 300 | 300 |
| 300 bytes for one instance of block C full data | 1 | 300 | 300 |
| 2 bytes for each subsequent occurrence of block A | 10 | 2 | 20 |
| 2 bytes for each subsequent occurrence of block B | 8 | 2 | 16 |
| 2 bytes for each subsequent occurrence of block C | 4 | 2 | 8 |
| raw encoding size |  |  | 944 |

Thus, in this example, the raw encoding size is reduced from 7500 bytes (25 blocks×300 bytes per block) to 944 bytes.

FIG. 6 illustrates another example in which the benefit of the dictionary look-up encoding aspect of the present invention is beneficial. In this example, frame 510 is the same frame illustrated in FIG. 5 and frame 610 follows frame 510. In this example, the base encoding would identify six blocks as having changed (blocks 611, 612, 613, 614, 615, and 616). The application recognizes that it has just sent the data for displaying blocks of type A and type B. Therefore no raw data is sent with this frame because the raw data exists as a result of the previous frames encoding. The raw encoding size is six blocks time's 2 bytes or 12 bytes total.

As a particular application of this aspect of the present invention, assume that a particular object in a video display is moving. As the object moves, the blocks in the frames will differ. However, if the background remains the same, depending on the motion and size of the object, the video information depicting the moving object can be greatly reduced. For instance, if the object can fit entirely within a single block, then as the object moves, a very limited number of blocks are required to be transmitted and instead, the identification of the previously transmitted blocks can be transmitted. This can also apply if the object is larger than a block size. In essence, as the object moves across the background, a very limited number of actual blocks will require transmission. Thus, prior to transmitting a block, previously transmitted blocks are examined to verify if a similar block has been transmitted.

The speed of the look-up process can also be increased by applying a "smart" dictionary look-up procedure. The smart dictionary look-up procedure involves searching blocks that are visually displaced from a current block in either the horizontal, vertical or diagonal directions. Thus, if an object is moving, the smart dictionary look-up process can quickly identify similar blocks that have been transmitted and then simply transmit the identification of the similar block. This process reduces the amount of time required to search the entire dictionary for a match.

One aspect of the present invention is to provide a refresh scan line. The refresh scan line is beneficial for clients that request a stream in the middle of a broadcast or for clients that have lost synchronization for various reasons. For example, if a client requests a stream in the middle of building the dictionary encoding lookup table, the client will begin building the table once connected to the stream. However, because frames at time t may depend on blocks that appeared in an earlier frame, the client may not have the necessary information to create the display of a frame. For instance, suppose a client starts receiving the stream at frame 2, the client would receive multiple index references to blocks that do not exist in the client dictionary because the client missed the initially transmitted blocks in frame 1 and was not able to construct a dictionary encoding lookup table. The refresh scan line aspect of the present invention provides a remedy for this situation. A complete row of blocks from the reference or base frame (called a scan line) is sent every n frames so that after only a few seconds, a client should have a complete copy of the lookup table. In implementing this aspect of the present invention, the transmission of the scan lines is performed through bypassing the dictionary lookup process. This aspect of the present invention also insures that the client receives static portions of the stream. Static portions of the stream are blocks that rarely or never change throughout the broadcast. These blocks would be transmitted on startup only and not sent with subsequent encoding because they do not change.

The streaming process 200 identifies data to be transmitted as part of a stream output. Prior to the transmission, the data may go through an encoding process. The encoding process outputs a buffer of raw image data that has been identified to be sent as part of the stream. This data is transmitted in the order that it is identified. This accumulated image data is then compressed, for example, using the standard JPEG compression. The JPEG algorithm is well known in the art and relies on patterns within the image to achieve compression. Accumulating the image data for compression rather than compressing individual blocks allows the JPEG algorithm to more reliably detect these patterns and achieve a higher level of compression. The JPEG compression algorithm is a lossy compression mechanism. Lossy algorithms degrade the image being compressed in order to gain reduced output size. The streamer process 200 maintains a variable that controls the tolerance for this degradation. This parameter controls the image quality and is an integer value between zero and one hundred. Zero is total loss and one hundred is no compression. It should be appreciated that other compression algorithms could be used or no further compression may be performed in other embodiments of the present invention.

The streamer process 200 takes the information that results from the encoding and image compression process and prepares a package capable of being decoded on the receiving end. An exemplary construction for this package construction is provided for illustrative purposes only. In constructing the package, the package can be constructed as a binary image in memory.

The first twenty four bytes of the package consist of a packet header which can include, but is not limited to, information about the block size in pixels, the total count of image blocks included, the block dimensions of the image, the total count of blocks included in the message, and the current refresh line.

The next (n) bytes of data in the package consist of an index of blocks that have been identified as having changed. This table contains information about the blocks that have changed from the previous frame to the current frame. The information for each block consists of the X,Y coordinate of the block that has changed, a Boolean value that indicates if image data is included or the block is a dictionary lookup, and the index of the data associated with the block.

The next (n) bytes of data consists of the JPEG compressed data.

Once the package is constructed it can then be further compressed using algorithms such as the GNU ZLIB compression library.

In the preferred embodiment, streamer process 200 utilizes TCP/IP to transmit stream data. The socket layer of the streamer process 200 accepts data for distribution to the master server. It should be understood by those skilled in the art that data transmitted via any network is subject to bandwidth and congestion problems. The streamer process 200 maintains a queue of data to be transmitted. Given the real-time necessity of the application being solved by aspects of the present invention, the maximum queue size is a configurable parameter that specifies the total amount of data that is allowed to back up for transmittal. This parameter is configured to allow for a realistic maximum frame size of 10K bytes. If the queue grows larger than this configurable size, the streamer terminates the connection with the master reflector, clears the transmittal queue and reconnects. If the connection is reset, the stream continues at the current frame and the frames that were in the queue are dropped frames. Thus, in an exemplary embodiment of the present invention, such logic could be used to ensure that the data is either sent in real-time or not at all.

In an effort to ensure reliable delivery of the streaming video, one aspect of the present invention is the utilization of redundancy through the use of multiple reflectors. The streamer process 200 includes a configuration file with a list of master reflectors. Upon start up, the streamer process 200 connects to the first entry in this list. If the streamer process 200 cannot connect or this connection is dropped during active streaming, the streaming process 200 attempts to reconnect a maximum of times (i.e., three times). If after the maximum number of reconnection attempts the streamer fails to connect to the current master reflector, the streamer selects the next master reflector configured and attempts to connect. If the streamer fails through the last configured reflector, the streamer recycles the master reflector list and starts over at the top.

Due to the matrix configuration between data centers, as is further described below, this logic allows for localized outages between the streamer and the primary reflector. This outage may be caused by Internet outage at the data center, software failure, or hardware failure.

Another aspect of the present invention is to limit the bandwidth consumed by providing the streaming video. A configurable parameter associated with a stream is used to identify the maximum allowable bandwidth utilized by the stream. In this aspect of the present invention, the streamer process 200 operates to monitor the amount of data that has been encoded in any given second. If the calculated bandwidth is greater than the maximum bandwidth the application temporarily stops capturing frames for a period of time (i.e., one second). This operation allows the network to absorb the excess data.

As a result of the paused introduced in association with the bandwidth limiting aspect of the present invention, a condition may occur where the stream appears to jitter (the stream stops and then continues). This phenomenon is due to the streamer capturing at a frame rate that causes a consistent bandwidth overflow. For example, assume that each frame of a given stream is 10k bits in size, that the streamer process 200 captures 10 frames per second, and that the maximum bandwidth is set to 50k bits. The process would operate to capture 5 frames in the first half second (consuming the 50k bits of bandwidth) and then invoke a pause in time before the next frame is transmitted.

Another aspect of the present invention addresses this problem by providing frame rate smoothing. Frame rate smoothing allows the delay to be introduced for the bandwidth limiting aspect of the present invention without resulting in jitter, or at least diminishing the effect of jitter. In operation, a configurable parameter is used to identify an inter-frame delay in tens of microseconds. For example given the above example, to achieve a desired frame rate of 5 frames per second, the inter frame delay could be set around 200 (2,000 micro seconds or 0.2 seconds).

This number will vary depending on stream complexity and processing value available as the inter frame delay is also governed by the amount of time required to process a frame.

Another aspect of the present invention is the provision of automatic bandwidth degradation. This is a self-healing function of the streamer process 200. If the real-time protection mechanism described above is activated, the streamer process 200 will reduce the streamer process's parameters for bandwidth by one kilobit and increase the inter frame delay value by 1000 microseconds. This allows the streamer process 200 to throttle down when it is run over degraded or slower network connections.

In an exemplary implementation of the streaming process, when the streamer process 200 is started, it is provided with or reads a configuration file. The streamer reads this configuration file to obtain a list of master reflectors to which it can connect. Upon reading this list, the streamer process 200 connects to the master reflector. Once a connection is established, the streamer sends a login message to the server. The server then sends a login response. If the log in fails, the connection is terminated and the logic described in the redundancy section is activated. If the login succeeds, the streamer process then sends a message to the server indicating the current values of the runtime configurable parameters. The configurable parameters can include, but are not limited to the following parameters: frame rate limiting function, max bandwidth, color fuzzifications—rounding factor for comparisons, BLOCKX—Number of pixels per block in the x direction, and BLOCKY—Number of pixels per block in the y direction.

Further, the exemplary implementation of the streaming process may include a control panel. From the control panel, certain controls or parameters can be accessible from an administrative control panel within the client. To adjust these values, a client must be configured to display them, as well as the client must be connected to the reflector that is directly receiving the stream from the capture process. When adjusting these controls, only the captured image is modified and not the actual output of the capturing device. This is similar to the same controls on a standard television set. It is important to note that while these controls can help enhance an image, there is no substitute for a good source from the camera. The controls include, but are not limited to the following: hue, color, contrast, whiteness, brightness, channel and sub-channel. For the channel control, this control identifies which channel the capture process is transmitting.

This is the same concept as frequency for radio or television signals. The sub-channel is a new concept and it denotes a reduced quality of a main stream. The concept is that channel 1 sub-channel 0 would be the full stream, and channel 1 sub-channel 1 would provide the same stream but at a reduced frame rate. These streams are generated by the workhorses described below. Advantageously, the streaming process 200 simply provides one full stream to the reflector layer 102 and the reflector layer 102 can then create multiple streams of various degrees of quality and bandwidth requirements. If this task were performed by the streaming process 200, bandwidth could potentially be wasted if none of the client systems request degraded video data streams. Using this aspect of the present invention, if all of the requesting clients only require a lower quality data stream, the reflection layer can create the lower quality stream in sub-channels and provide them to the clients, thus saving bandwidth by not re-broadcasting the full stream. If some of the clients request full data streams while others request lower quality data streams, these multiple channels can be provided without overtaxing the bandwidth between the streaming layer and the reflection layer and off loading the processing of creating additional streams to a more processor intensive layer.

Master Reflector Process.

The master reflector is the conduit for re-broadcasting a stream to other server processes and clients. This process accepts incoming connections from streamer units, initiates connections to chained reflectors and workhorses, as well as accepts client connections.

Streamers initiate connections to a master reflector using TCP/IP sockets for communication. Once a connection is established the streamer process sends a login message to the master reflector. This message contains the intended broadcast channel and sub-channel as well as an authentication code. When a stream is authenticated by the master reflector, the master reflector forwards all stream data to down stream connections.

The master reflector reads a configuration file to obtain connection information about server processes with which it should maintain connections. The master reflector initiates a TCP/IP socket connection to the configured down stream workhorses and chained reflectors.

The master reflector process provides redundancy in that it will continuously attempt to reconnect to all configured workhorse processes and chained reflectors if a connection is lost. Multiple master reflectors are used to allow stream fail over. The chained reflectors accept stream feeds from multiple master reflectors. Given this situation if a master reflector fails the streamers that were being fed through the master reflector will fail over to the secondary master reflector. The clients attached to the chained reflector will see a pause in the stream while this occurs and then continue receiving the stream from the secondary master reflector.

Workhorse Process.

The workhorse process receives all sub-channel 0 streams delivered to the master reflector. These streams are the full-bandwidth streams published by the streamer process. The workhorse process takes each successive frame for each stream and decodes it into an in-memory picture of the current frame. At configurable intervals, the workhorse process takes the in-memory image and builds a stream package, as described in conjunction with the streamer process, of the image blocks that have been modified since the last interval. The workhorse process takes this package and then transmits it back to the reflector process publishing this stream on a configured sub-stream. For example if there are 2 source streams, channel 1 and channel 2 running at an average 5 frames per second, both streams are received by the workhorse process. The workhorse process is configured to output 1 frame a second on sub-channel 1. Both streams would be decoded into separate buffered images. Once a second, the workhorse process consolidates the buffered image data into a package. The workhorse process publishes these packages back through the master reflector process as the assigned channel and sub-channel 1. It should be appreciated that other sub-channels could also be used to provide other frame rates and various quality video feeds.

Separating the workhorse process from the master reflector process allows for the setup of workhorse farms to offload processing overhead and to allow for scalability.

The workhorse process contains both the encoding and decoding processes for the video data. As frame packages are received for a given stream, the transmitted blocks are decoded and placed in a list. If overlapping blocks are sent in successive frames, the stale block is thrown away and the new block is placed in the list. When the configurable time interval is reached the workhorse takes this list of modified blocks and builds a frame package as described in conjunction with the streamer process 200.

The workhorse process accepts input source streams from the master reflector process. In this transaction, the master reflector logs into the workhorse. The workhorse process also initiates a connection back to the master reflector for the purpose of outputting the fixed frame rate stream. The workhorse process authenticates back to the master reflector for the outbound connections.

The workhorse process is part of the reflector matrix. This matrix can be duplicated as many times as desired for fail over purposes, thus providing redundancy. The workhorse process will attempt to reconnect outbound stream connections on failure. The workhorse process attempts reconnections indefinitely.

The inbound connections are maintained by the master reflector and are retried in the same manor.

Chained Reflector Process.

The chained reflector process is the public publishing points of the video stream. The chained reflector accepts source streams and sub-channel streams from master reflectors and rebroadcasts them to clients.

In operation, the chained reflector accepts TCP/IP connections from both the master reflector and clients.

One aspect of the present invention is the tiered architecture developed through the use of chained reflectors. This aspect of the present invention provides scalability. The master reflector has the ability to service multiple chained reflectors. In an exemplary embodiment, based on the use of a Linux kernel, the chained reflector can handle a thousand clients. More or less clients can be handled based on the particular implementation and the present invention should not be limited to any particular number.

Most firewalls and NAT configurations block inbound connections. The video system is designed to initiate connections from the client side to the server. This alleviates a large portion of the firewall issues. Some firewalls also block outbound connections. Network administrators commonly allow outbound traffic on the standard web server port. The standard web server port is port eighty. In the exemplary configuration illustrated in FIG. 1, two physical machines are publishing video streams with eight chained reflector processes. Each of these machines has one chained reflector that is started on port eighty. This is done to allow access to users behind firewalls configured in this manor.

Each configured chained reflector can service any stream sent to any master reflector which feeds the chained reflector. Multiple chained reflectors are used to allow for scalability and redundancy.

Client Process.

The client application runs on the end user's computer and handles logging into a chained reflector, requesting a stream, uncompressing and decoding the data sent to it by the reflector, and displaying the decoded frame on the graphics device. The client may also be configured to allow remote administration of the streams properties.

Initially, the client process running on a client device 150 initiates a TCP/IP connection to a chained reflector 140. Once the connection is established, the client process sends a login message requesting subscription to a specific channel and sub-channel served by the chained reflector. Once this authentication takes place the client process receives a message containing the streams current properties. The client process uses this information to determine the image size and how to decode the stream. The client process then begins receiving the frame packets. The client process receives frame packets from the chained reflector 140 and decompresses the package using the necessary tools required by the final compression technique. In an exemplary embodiment, these tools include the GNU ZLIB library. The client process then decompresses the JPEG data at the end of the package and places it in a buffered display area. The client then walks the index of difference blocks and either looks up the image data from the remembered dictionary based on the identification value in the index or it 'cuts' the image data from the buffered display area. If the data existed in the buffered area, the block is added to the dictionary at this point. Once the block data is retrieved the data is then pasted into a secondary image buffer that is an un-scaled buffer representing the current frame.

In the preferred embodiment, the client process will not display an image unless a entire image is received. This feature prevents the user from seeing the frame build-in and presents them with a complete image. When the first frame is decoded, the current refresh line is recorded. The moving of the buffered image to the actual display is suppressed until the refresh line wraps back to the recorded initial value. If the stream is configured not to send a refresh line, this logic is bypassed and the client is forced to view the frame build.

The client displays the image to the user by stretching the buffered image to fit the coordinates of the configured viewing area. This allows the client to control the displayed size of the video window.

The client process can implement redundancy by being configured with a list of chained reflectors. This configuration provides the client process with an ordered list of reflectors for which a connection can be attempted. The client process can walk this list in a top down fashion until a connection is established. If a connection fails during normal operation, the client can attempt to reconnect a particular number of times, such as three times, and then proceed to the next entry in the list. If the last configured reflector fails the client can wrap back around to the beginning of the list.

The exemplary configuration of the chained reflectors illustrated in FIG. 1 includes eight chained reflector processes running across two data centers. The chained reflector list can optionally be ordered to alternate between data centers to keep reconnect times down in the event of a data center failure.

The last two chained reflectors in the client process connection list are preferably to the chained reflectors which use port eighty. Port eighty, as described in the chained reflector section is firewall friendly. The list can be ordered in this manner to allow clients behind firewalls to filter down to port eighty and keep these processes load balanced.

In an exemplary embodiment, the client process may be configured with administrative rights on a master reflector. These rights enable a client to control certain properties of a stream.

Figure 7:
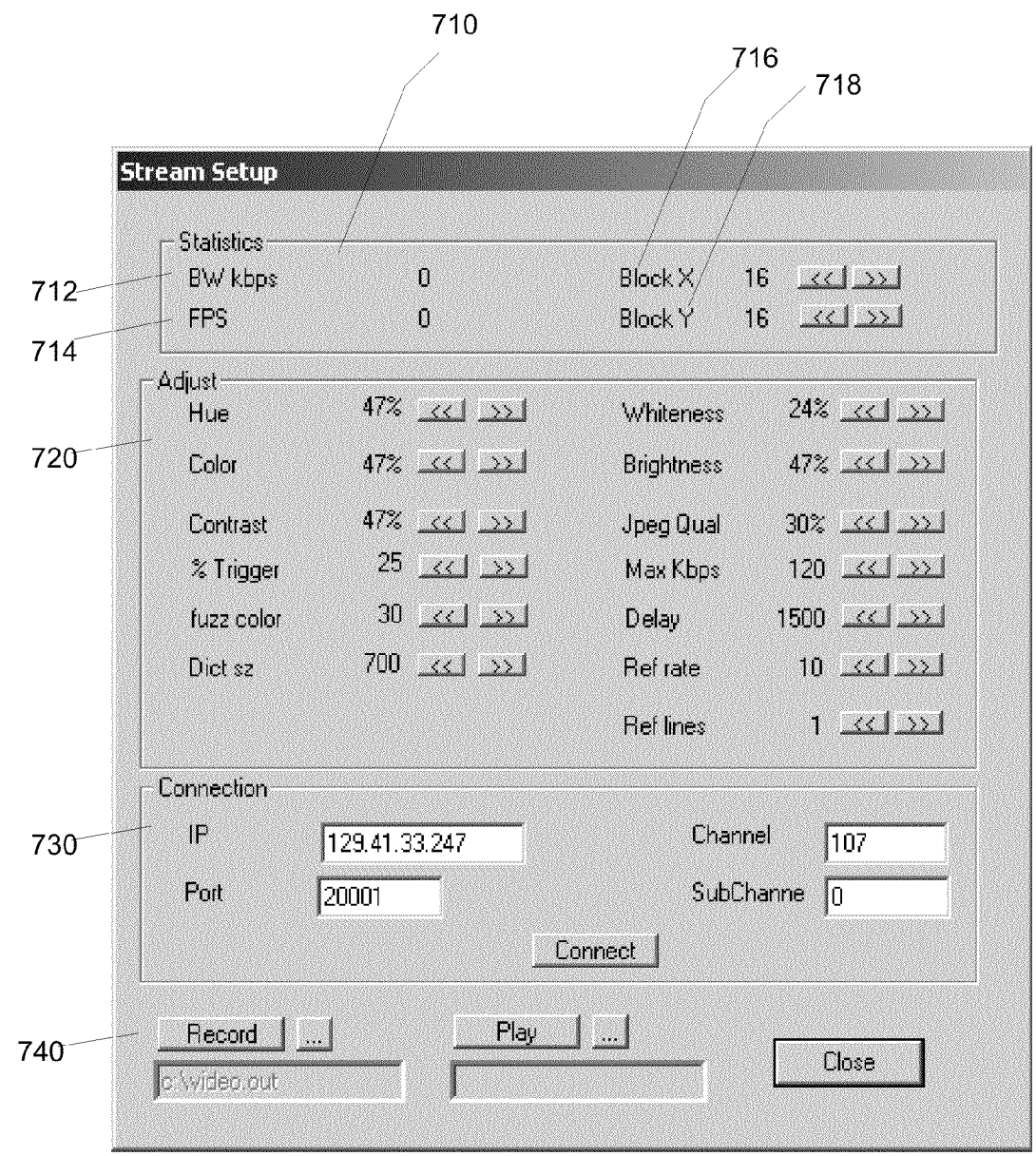
FIG. 7 is a screen shot illustrating an exemplary administrative screen that can be accessed by the client process.

FIG. 7 is a screen shot illustrating an exemplary administrative screen that can be accessed by the client process. As can be seen, the client process can be configured to allow users to modify several options and configurations. In the displayed screen shot, a statistics section 710 is displayed. The statistics section 710 of the screen displays current stream characteristics such as the current bandwidth used for receiving 712, the current frame count per second 714, the pixels per block in the x direction 716 and the current pixels per block in the y direction 718.

The displayed screen shot may also include an adjust section 720. The illustrated adjust section of the display screen can include two categories of controls. The first category allows the user to control the driver capture properties. The controllable attributes include the hue, color, contrast, whiteness and brightness. These settings modify the image that is presented to the encoding logic. The second category of controls in the adjust section 720 are used to adjust the encoding logic. Percent trigger allows the user to increase or decrease the sensitivity to change of the difference detection logic. This percent is the percentage of pixels in a block that must change from the last frame in order to trigger the sending of the block.

The fuzzy color value determines the rounding factor used when comparing the color components of a pixel.

The dict sz property allows the user to adjust the maximum number of blocks the client stores in the dictionary for lookups.

The max kbs property allows the user to adjust the bandwidth limiting trigger value. Bandwidth in excess of this value triggers the logic described in the streamer document. The delay property adjusts the inter-frame property. This value is described in the streamer section of this document.

The refresh rate property determines how often a refresh band is sent in the stream. This value is measured in frames.

The refresh lines property determines the number of lines to be sent in a refresh band. The refresh line and refresh rate property work together. For example you might use these properties to configure the stream to send 1 refresh line per 10 frames.

The properties in the adjustable section are only functional if the client is logged into the master reflector that is directly connected to the streamer being adjusted.

A third section of the illustrated display screen is the connection section 730 which allows the user to manually adjust the current connection properties. The connection section 730 enables the user to specify a reflector IP and port to which to connect. This section also allows the user to adjust which channel and sub-channel for a connection.

The bottom portion of the displayed screen shot is the record/playback section 740. The record/playback section enables the user to record and playback the current stream. The record function takes the raw stream as it is received and writes it to the specified file. The play feature reads the raw data from the file and plays it through the receive logic on the client.

The present invention has been described using detailed descriptions of embodiments thereof that are provided by way of example and are not intended to limit the scope of the invention. The present invention can be implemented as a process that runs within a variety of system environments or as an entire system including various components. The described embodiments comprise different features, not all of which are required in all embodiments of the invention. Some embodiments of the present invention utilize only some of the features, aspects or possible combinations of the features or aspects. Variations of embodiments of the present invention that are described and embodiments of the present invention comprising different combinations of features noted in the described embodiments will occur to persons of the art.

What is claimed is:

1. A system for providing the delivery of real-time video in a bandwidth efficient manner to a plurality of remote computing devices, the system comprising the components of:
   a reflector system communicatively coupled to the plurality of remote computing devices over a network connection; and
   a streaming system communicatively coupled to the reflector system over a network connection, the streaming system being configured to:
      receive a stream of video data from a video source and divide the stream into frames, with each frame being further subdivided into blocks where each block contains a particular number of pixels and each pixel having a characteristic component;
      identifying a first frame as a base frame;
      compare the blocks of a next frame with the blocks of the base frame to identify changed blocks that differ by a threshold amount; and
      transmit blocks of the base frame and the changed blocks to the reflector system;
      delaying a fixed period of time based upon a configuration setting prior to attempting to capture the next sequential frame;
      reducing the bandwidth required to transmit the frame if the frame transmit queue reaches a maximum limit; and
   automatically increase the inter-frame delay by a fixed amount defined by a configuration setting
   the reflector system being operative to:
      receive the transmitted blocks and retransmit the received blocks to the plurality of remote computing devices.

2. The system of claim 1, wherein the streaming system is further operative to maintain a list of blocks previously transmitted to the reflector system and, if a changed block is substantially similar to a block in the previously transmitted list, only transmit a block identification rather than the entire changed block and,
   wherein the reflector system is further operative to receive the block identification and re-transmit the block identification to the client system, whereby a remote computing device that maintains a list of previously received blocks can, upon receiving a block identification, look-up the block in the previously received list and update the display device by replacing the corresponding block on the display device with the looked up block.

3. The system of claim 1, wherein the received transmitted blocks are received as a full stream and the reflector system is further configured to transmit the received blocks to the remote computing devices in multiple streams of various degrees of quality.

4. The system of claim 1, wherein the received transmitted blocks are received as a full stream and the reflector system is further configured to transmit the received blocks to the remote computing devices in multiple streams of various degrees of bandwidth requirements.

5. The system of claim 1, wherein the received transmitted blocks are received as a full stream and the reflector system is further configured to transmit the received blocks to the remote computing devices in multiple streams of various degrees of quality by transmitting the stream as one channel-sub-channel at a first degree of quality and another channel-sub-channel at a second degree of quality.

6. The system of claim 1, wherein the received transmitted blocks are received as a single, full stream from the streaming system and the reflector system is further configured to service the plurality of remote computing devices, requiring varying degrees of streaming signal quality by providing a first channel of streaming signal at a first frame rate for a first remote computing device and second channel of streaming signal at a second frame rate for a second remote computing device.

* * * * *